United States Patent
Kim

(10) Patent No.: US 7,463,883 B2
(45) Date of Patent: Dec. 9, 2008

(54) MULTI-FUNCTIONAL INTEGRATED CIRCUIT APPARATUS IN MOBILE COMMUNICATION TERMINAL AND DRIVING METHOD THEREOF

(75) Inventor: Sung-Min Kim, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 439 days.

(21) Appl. No.: 11/250,980

(22) Filed: Oct. 13, 2005

(65) Prior Publication Data

US 2006/0105756 A1    May 18, 2006

(30) Foreign Application Priority Data

Oct. 14, 2004    (KR) ............... 10-2004-0082282

(51) Int. Cl.
    *H04M 3/00*    (2006.01)
    *H04Q 7/20*    (2006.01)
(52) U.S. Cl. .............. 455/418; 455/550.1; 455/425
(58) Field of Classification Search ........... 455/418, 455/186.1, 419, 550.1, 552.1, 554.2, 425; 713/182, 185
    See application file for complete search history.

(56) References Cited

U.S. PATENT DOCUMENTS

| | | | |
|---|---|---|---|
| 6,513,121 B1* | 1/2003 | Serkowski | 726/29 |
| 7,290,144 B1* | 10/2007 | Kitaj et al. | 713/182 |
| 2005/0283806 A1* | 12/2005 | Torvinen | 725/62 |
| 2006/0015674 A1* | 1/2006 | Murotake | 711/101 |
| 2006/0223515 A1* | 10/2006 | Hermel et al. | 455/418 |
| 2007/0288661 A1* | 12/2007 | Guillemot et al. | 709/247 |

FOREIGN PATENT DOCUMENTS

| | | |
|---|---|---|
| CN | 1255008 | 5/2000 |
| CN | 1408171 | 4/2003 |
| KR | 1020040055243 A | 6/2004 |

* cited by examiner

*Primary Examiner*—Sonny Trinh
(74) *Attorney, Agent, or Firm*—Lee, Hong, Degerman, Kang & Waimey

(57) ABSTRACT

A multi-functional integrated circuit (IC) apparatus in a mobile communication terminal capable of implementing at least two functions by using one IC of the mobile communication terminal, and a method thereof. Programs are set according to each module by using a PLD, interfaces having different functions are shared by using one IC, and a plurality of modules are controlled. That is, one IC can replace at least two ICs.

15 Claims, 2 Drawing Sheets

MULTI-FUNCTIONAL INTEGRATED CIRCUIT APPARATUS IN MOBILE COMMUNICATION TERMINAL AND DRIVING METHOD THEREOF

Pursuant to 35 U.S.C. § 119(a), this application claims the benefit of earlier filing date and right of priority to Korean Patent Application No. 10-2004-0082282, filed on Oct. 14, 2004, the content of which is hereby incorporated by reference herein in its entirety.

BACKGROUND OF THE INVENTION

1. Field of the Invention

The present invention relates to a mobile communication terminal, and more particularly, to a multi-functional integrated circuit (IC) apparatus in a mobile communication terminal capable of implementing at least two functions by using one IC, and a driving method thereof.

2. Description of the Related Art

As mobile communication techniques and manufacturing techniques for mobile communication terminals develop, users can take photographs, watch videos, listen to music, access the Internet, or play games by using the mobile communication terminal. A mobile communication terminal that supports such various functions is not merely a mobile phone, but can be referred to as a mobile entertainment system.

In order to implement such various functions, the mobile communication terminal has to be provided with corresponding modules, for example, a camera module for capturing images and videos, an MP3 module for listening to music, a memory module for storing different types of multimedia data, an infrared data association (IrDA) module for performing infrared signal communications, etc. Each of the multiple modules has to be provided with an integrated circuit (IC) for generating different synchronization signals and clock signals. This is because a single IC is set up to perform a single operation via a connection with a single interface using a program within a programmable logic device (PLD) when the mobile communication terminal is turned on.

Therefore, in order to implement various functions in the related art, the mobile communication terminal has to be provided with multiple modules and multiple integrated circuits for driving the modules. Thus, there are difficulties in minimizing the overall size of the mobile communication terminal and lowering its manufacturing and production costs.

BRIEF DESCRIPTION OF THE INVENTION

Therefore, an object of the present invention is to provide a multi-functional integrated circuit (IC) apparatus in a mobile communication terminal capable of implementing at least two functions by using a single IC, and a driving method thereof.

To achieve these and other advantages and in accordance with the purpose of the present invention, as embodied and broadly described herein, there is provided a multi-functional integrated circuit apparatus in a mobile communication terminal, the apparatus comprising: an inputting unit for receiving a user's control command; a controller for recognizing the user's control command inputted to the inputting unit and controlling each unit; a programmable logic device (PLD) having a program for implementing a specific mode by the controller; a plurality of modules, each for implementing its own specific mode by the program of the PLD; and a displaying unit for displaying each kind of message and a module performing screen.

Preferably, when a mode conversion mode is selected by the user, the controller detects a new module required according to the mode conversion and then sets an operation program corresponding to the new module into the PLD.

Preferably, the program is a program for synchronizing synchronization signals and clock signals between the PLD and a corresponding module for implementing a specific mode.

Preferably, the mobile communication terminal is provided with one IC for implementing a plurality of modes.

To achieve these and other advantages and in accordance with the purpose of the present invention, as embodied and broadly described herein, there is also provided a method for driving a multi-functional integrated circuit apparatus in a mobile communication terminal, the method comprising: setting an operation program of a first module for implementing a first mode requested for a specific mode implementation to a programmable logic device (PLD); implementing the first mode by operating the first module; judging whether a mode conversion mode has been selected or not; setting an operation program of a second module for implementing a second mode requested for a mode conversion into the PLD, if the mode conversion has been selected; and implementing the second mode by operating the second module.

Preferably, the first module is a module set as a default value in implementing the first mode.

Preferably, the operation program of the first module is a program for synchronizing synchronization signals and clock signals between the PLD and the first module, and the operation program of the second module is a program for synchronizing synchronization signals and clock signals between the PLD and the second module.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Reference will now be made in detail to the preferred embodiments of the present invention, examples of which are illustrated in the accompanying drawings.

Hereinafter, an exemplary preferred embodiment of the present invention will be explained with reference to the attached drawings.

Figure 1:
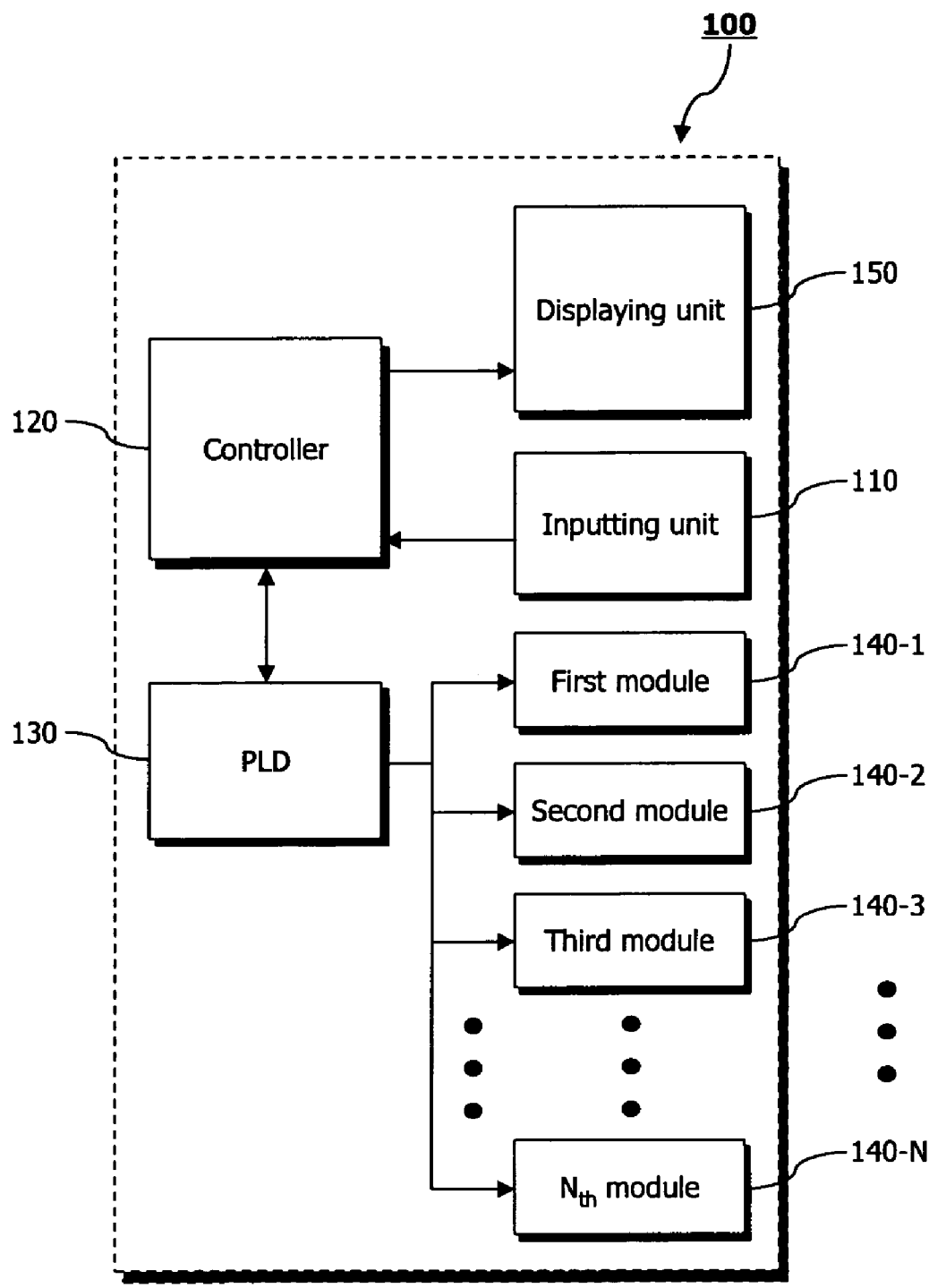
FIG. 1 is a construction view showing a multi-functional integrated circuit (IC) apparatus in a mobile communication terminal according to an exemplary embodiment of the present invention.

FIG. 1 is a construction view showing a multi-functional integrated circuit (IC) apparatus in a mobile communication terminal according to an exemplary embodiment of the present invention.

As shown in FIG. 1, the multi-functional integrated circuit (IC) apparatus 100 in a mobile communication terminal according to an exemplary embodiment of the present invention comprises an inputting unit 110 for receiving a user's control command, a controller 120 for recognizing the user's control command inputted to the inputting unit 110 and controlling various components, a programmable logic device (PLD) 130 having a program for implementing a specific mode by the controller 120, a plurality of modules 140-1 to 140-N, each module for implementing its own specific mode by the program set to the PLD, and a displaying unit 150 for displaying each kind of message and a module performing screen.

The inputting unit 110 may be a key pad or a touch screen, and may be provided with function keys for implementing a specific mode and a module conversion mode. The function keys can be constructed as "hot keys" for immediately implementing corresponding functions by a single key selection.

The controller 120 may be constructed as a processor such as a mobile station modem (MSM) or a mobile station processor (MSP). Once receiving a user's control command inputted to the inputting unit 110, the controller 120 sets a program suitable for a module that performs a corresponding mode into the PLD 130, and operates the corresponding module among the plural modules 140-1 to 140-N, to thereby implement a specific mode requested by the user. At the time of mode conversion, a program suitable for a module that performs a requested mode is set to the PLD 130, and then the corresponding module is operated and the corresponding specific mode is implemented.

The PLD 130 sets a program suitable for a module that performs a mode requested by the user by the controller 120, and performs the corresponding module with the set program. When a mode conversion is requested by the user, the PLD 130 newly sets a different program suitable for a module that performs a requested mode, and then performs the corresponding module with the newly set program.

The plural modules are modules for implementing various functions supported by the mobile communication terminal, and are operated by programs of the PLD 130 set by the controller 120. One of the plural modules 140-1 to 140-N is set as a basic value thereby to perform a specific mode by an initial control. The plural modules are composed of N modules including a first module 140-1, a second module 140-2, . . . , and an $n^{th}$ module 140-N.

The displaying unit 150 includes a liquid crystal display (LCD) provided at the mobile communication terminal, and can display images to the user. Generally, the displaying unit 150 displays a message or an icon for informing various information to the user, or displays a screen on which a module is performed.

Figure 2:
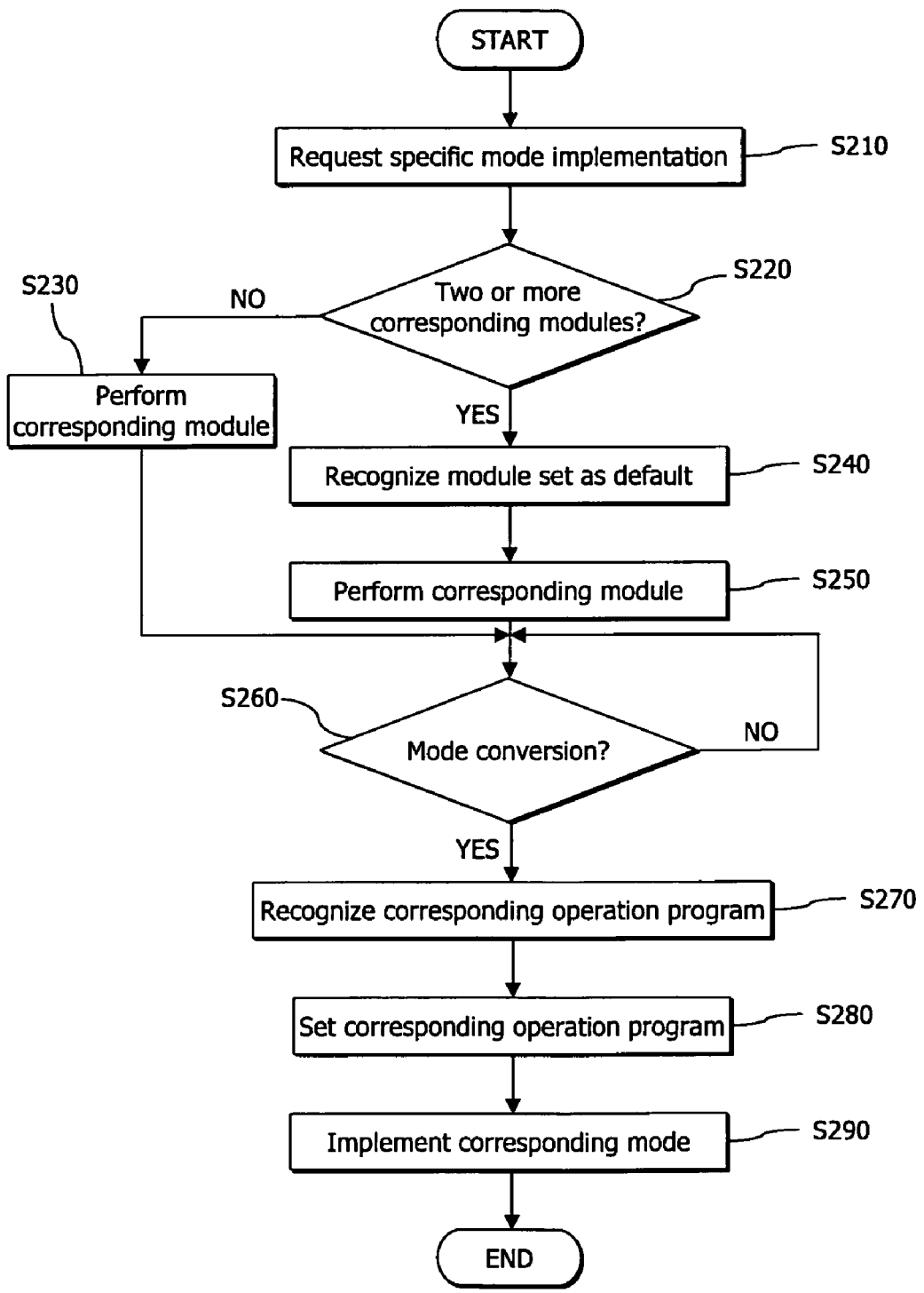
FIG. 2 is a flowchart showing a method for driving a multi-functional integrated circuit (IC) apparatus in a mobile communication terminal according to an exemplary embodiment of the present invention.

FIG. 2 is a flowchart showing a method for operating a multi-functional integrated circuit (IC) apparatus in a mobile communication terminal according to an exemplary embodiment of the present invention.

Referring to FIG. 2, the user requests a specific mode by controlling function keys provided at the inputting unit 110 (S210).

Then, the controller 120 receives a signal for requesting the specific mode from the inputting unit 110, and then judges whether or not the number of modules for implementing the requested specific mode is more than two (S220).

As a result of the judgment, if the number of the modules for implementing the requested specific mode is less than two, that is, if only one module exists, the controller 120 sets a program of the corresponding module and performs the module thereby to implement the corresponding mode.

On the contrary, when the number of the modules for implementing the requested specific mode is two or more, the controller 120 detects a module set as a default (S240).

The controller 120 sets a program corresponding to the detected module and performs the detected module, thereby implementing the corresponding mode (S250). An operation state of the module is displayed on the displaying unit 150.

In step S230 or S250, the controller 120 judges whether a mode conversion mode has been selected (S260). If so, the controller 120 detects a new module requested according to the mode conversion.

The controller 120 sets an operation program of the newly detected module to the PLD 130. For the setting, an operation program of the previous module set as a default value is deleted and then an operation program of the newly detected module is set. Otherwise, the operation program of the newly detected module may be overwritten on the operation program of the previous module set as a default value.

A process that the operation program of the newly detected module is set is displayed on the displaying unit 150.

The PLD 130 sets the operation program with main clock signals, horizontal synchronization signals, vertical synchronization signals, etc. that are suitable for the new module. Information regarding the main clock signals, data signals, etc. according to the modules 140-1 to 140-N is programmed in the PLD 130. The reason why an operation program is set according to a module selected by a module conversion mode is as follows.

For instance, if the modules 140-1 to 140-N are supposed to be camera modules, each camera module has image data inputted thereto after photographing, which is different from synchronization signals for displaying the image data on a part of the displaying unit 150 at a certain time point. Therefore, an operation program suitable for the corresponding camera module is set to the PLD 130. The modules 140-1 to 140-N include not only a camera module but also a voice recognition module, an infrared signal communication (IrDA) module, an MP3 module, a voice recording module, a memory card (SD, CF, MMC, etc.) slot module, etc.

When the operation program of the new module has been set, the controller 120 implements a specific mode of the new module by the set operation program (S290).

For example, when the first module 140-1 is set as a default value and the second module 140-2 is detected according to a mode conversion, if the user requests a specific mode by operating certain function keys, the controller 120 judges whether or not the number of modules for implementing the requested specific mode is more than two. As a result of the judgment, if the number of modules for implementing the requested specific mode is only one, the recognized single module is performed thereby to implement the corresponding mode. On the contrary, if the number of modules for implementing the requested specific mode is two or more, the controller 120 detects the first module 140-1 set as a default value. The controller 120 sets a program corresponding to the detected first module 140-1 and operates the first module 140-1, thereby implementing a specific mode corresponding to the first module 140-1. An operation state of the first module 140-1 is displayed on the displaying unit 150.

When a mode conversion mode has been selected, the controller 120 detects the second module 140-2 for implementing a mode requested according to the mode conversion.

The second module 140-2 is selected according to the mode conversion, and any module among the second to N$^{th}$ modules 140-2 to 140-N can be selected.

The controller 120 sets an operation program of the detected second module 140-2 to the PLD 130. For the setting, the operation program of the previous module set as a default value is deleted and then the operation program of the second module 140-2 is set. Otherwise, the operation program of the second module 140-2 may be overwritten on the operation program of the first_module 140-1. A process that the operation program of the second module is set can be displayed on the displaying unit 150. The operation program of the second module 140-2 is set to the PLD 130. That is, the PLD 130 sets the program with main clock signals, horizontal synchronization signals, and vertical signals according to the second module 140-2. Information regarding the main clock signals, data signals, etc. according to the modules 140-1 to 140-N is programmed in the PLD 130.

The controller 120 implements the specific mode of the second module 140-2 by the operation program of the second module 140-2.

As aforementioned, in the multi-functional integrated circuit (IC) apparatus in a mobile communication terminal and the method thereof, a single IC enables interfaces having different functions to be shared one another by using the PLD and also controls the plural modules, thereby replacing the multiple integrated circuits required in the related art by a single IC. Accordingly, the size of the mobile communication terminal can be decreased and the production costs can be reduced.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A multi-functional integrated circuit apparatus in a mobile communication terminal, the apparatus comprising:
   a controller for controlling various components according to a control command provided by a user;
   a programmable logic device (PLD) having a program for implementing a specific mode as determined by the controller; and
   a plurality of modules, each for implementing its own specific mode according to the PLD,
   wherein if a mode conversion mode is selected by the user, the controller detects a new module requested according to the mode conversion and executes an operation program of the newly detected module.

2. The apparatus of claim 1, further comprising:
   an inputting unit for receiving a control command from the user; and
   a displaying unit for displaying information related to each kind of message and a module performing screen.

3. The apparatus of claim 1, wherein the controller executes a program suitable for a module for implementing the specific mode, and then performs the corresponding module among the plural modules thereby implementing the specific mode requested by the user.

4. The apparatus of claim 1, wherein the controller replaces the program for implementing the specific mode with the the operation program of the newly detected module in the PLD.

5. The apparatus of claim 1, wherein the controller overwrites the operation program of the newly detected module on the program preset to the PLD.

6. The apparatus of claim 1 wherein the program is a program for synchronizing synchronization signals and clock signals between the PLD and the corresponding module for implementing the specific mode.

7. The apparatus of claim 1, wherein the mobile communication terminal is provided with one IC for implementing plural modes.

8. A method for operating a multi-functional integrated circuit in a mobile communication terminal, the method comprising:
   setting an operation program of a first module for implementing a first mode requested for a specific mode implementation to a programmable logic device (PLD);
   implementing the first mode by operating the first module;
   judging whether a mode conversion mode has been selected or not;
   setting an operation program of a second module for implementing a second mode requested for a mode conversion to the PLD, if the mode conversion has been selected; and
   implementing the second mode by operating the second module.

9. The method of claim 8, wherein the first module is a module set as a default for implementing the first mode.

10. The method of claim 8, wherein the operation program of the second module is set after the operation program of the first module preset to the PLD is deleted.

11. The method of claim 8, wherein the operation program of the second module is overwritten on the operation program of the first module preset to the PLD.

12. The method of claim 8, wherein the operation program of the first module is a program for synchronizing synchronization signals and clock signals between the PLD and the first module.

13. The method of claim 8, wherein the operation program of the second module is a program for synchronizing synchronization signals and clock signals between the PLD and the second module.

14. The method of claim 8, wherein the first mode and the second mode are implemented by a single IC.

15. The method of claim 8, further comprising displaying a process that the operation program of the first module and the operation program of the second module are set.

* * * * *